United States Patent
Iimura

(10) Patent No.: US 10,082,677 B2
(45) Date of Patent: Sep. 25, 2018

(54) EYEGLASS FRAME

(71) Applicant: Four Nines Co., Ltd., Tokyo (JP)

(72) Inventor: Yuichi Iimura, Tokyo (JP)

(73) Assignee: Four Nines Co., Ltd., Tokyo (JP)

( * ) Notice: Subject to any disclaimer, the term of this patent is extended or adjusted under 35 U.S.C. 154(b) by 0 days.

(21) Appl. No.: 15/432,445

(22) Filed: Feb. 14, 2017

(65) Prior Publication Data

US 2017/0248800 A1 Aug. 31, 2017

Related U.S. Application Data

(60) Provisional application No. 62/300,108, filed on Feb. 26, 2016.

(51) Int. Cl.
| | |
|---|---|
| G02C 5/14 | (2006.01) |
| G02C 5/18 | (2006.01) |
| G02C 5/00 | (2006.01) |
| G02C 5/22 | (2006.01) |

(52) U.S. Cl.
CPC ............ G02C 5/18 (2013.01); G02C 5/008 (2013.01); G02C 5/14 (2013.01); G02C 5/143 (2013.01); G02C 5/146 (2013.01); G02C 5/22 (2013.01); *G02C 2200/08* (2013.01)

(58) Field of Classification Search
CPC .......... G02C 5/18; G02C 5/143; G02C 5/146; G02C 5/16; G02C 5/22; G02C 5/2209; G02C 5/008; G02C 2200/08; G02C 5/14
USPC ........................................ 351/117, 111, 115
See application file for complete search history.

(56) References Cited

U.S. PATENT DOCUMENTS

| | | | | |
|---|---|---|---|---|
| 3,531,190 A | * | 9/1970 | LeBlanc | G02C 5/10 351/113 |
| 3,790,259 A | * | 2/1974 | Leblanc | G02C 5/146 16/228 |
| 4,153,347 A | * | 5/1979 | Myer | G02C 1/08 16/228 |
| 4,618,226 A | * | 10/1986 | Sartor | G02C 5/2254 16/228 |
| 4,780,928 A | * | 11/1988 | De Lorenzo Poz | G02C 5/2209 16/228 |
| 5,189,447 A | * | 2/1993 | Oleson | G02C 3/003 2/448 |
| 5,555,037 A | * | 9/1996 | Canavan | G02C 5/20 351/111 |
| 5,959,715 A | * | 9/1999 | Jaffelin | G02C 5/008 16/228 |
| 5,987,702 A | * | 11/1999 | Simioni | G02C 5/08 16/228 |
| 6,102,542 A | * | 8/2000 | Masuda | G02C 1/02 351/110 |
| 8,832,904 B2 | * | 9/2014 | Kidouchim | G02C 5/22 16/228 |
| 9,279,999 B1 | * | 3/2016 | Weng | G02C 5/2209 |
| 9,709,818 B1 | * | 7/2017 | Chen | G02C 5/2209 |
| 9,804,414 B1 | * | 10/2017 | Chen | G02C 5/2209 |

(Continued)

*Primary Examiner* — William R Alexander
(74) *Attorney, Agent, or Firm* — Nakanishi IP Associates, LLC

(57) ABSTRACT

An eyeglass frame includes a frame, temples rotatably attached to the frame, and eyeglass lenses attached to the frame. Each of the temples includes a temple core and a temple cover and forms a clearance between the temple core and the temple cover.

6 Claims, 5 Drawing Sheets

(56) References Cited

U.S. PATENT DOCUMENTS

| | | | |
|---|---|---|---|
| 2003/0020866 A1* | 1/2003 | Asano | G02C 5/00 351/122 |
| 2011/0181830 A1* | 7/2011 | Iimura | G02C 5/146 351/153 |
| 2013/0141689 A1* | 6/2013 | Calilung | G02C 5/22 351/153 |
| 2014/0022503 A1* | 1/2014 | Kheang | G02C 5/2218 351/153 |
| 2017/0017094 A1* | 1/2017 | James | G05B 19/4099 |

* cited by examiner

EYEGLASS FRAME

CROSS-REFERENCE TO RELATED APPLICATION

The present application is based on and claims priority to a provisional application U.S. 62/300,108, filed on Feb. 26, 2016, the disclosure of which is hereby incorporated by reference herein in its entirety.

BACKGROUND

Technical Field

The present application relates to an eyeglass frame.

SUMMARY

An object of this disclosure is to provide an eyeglass frame which has flexibility in the movement of temples so as to be easily adjusted to the user's face.

To achieve the above object, an aspect of this disclosure provides an eyeglass frame including a frame, temples rotatably attached to the frame, and eyeglass lenses attached to the frame. Each of the temples includes a temple core and a temple cover and forms a clearance between the temple core and the temple cover.

DETAILED DESCRIPTION

Hereinafter, an eyeglass frame of this disclosure will be described with reference to the drawings.

First Embodiment

Figure 1:
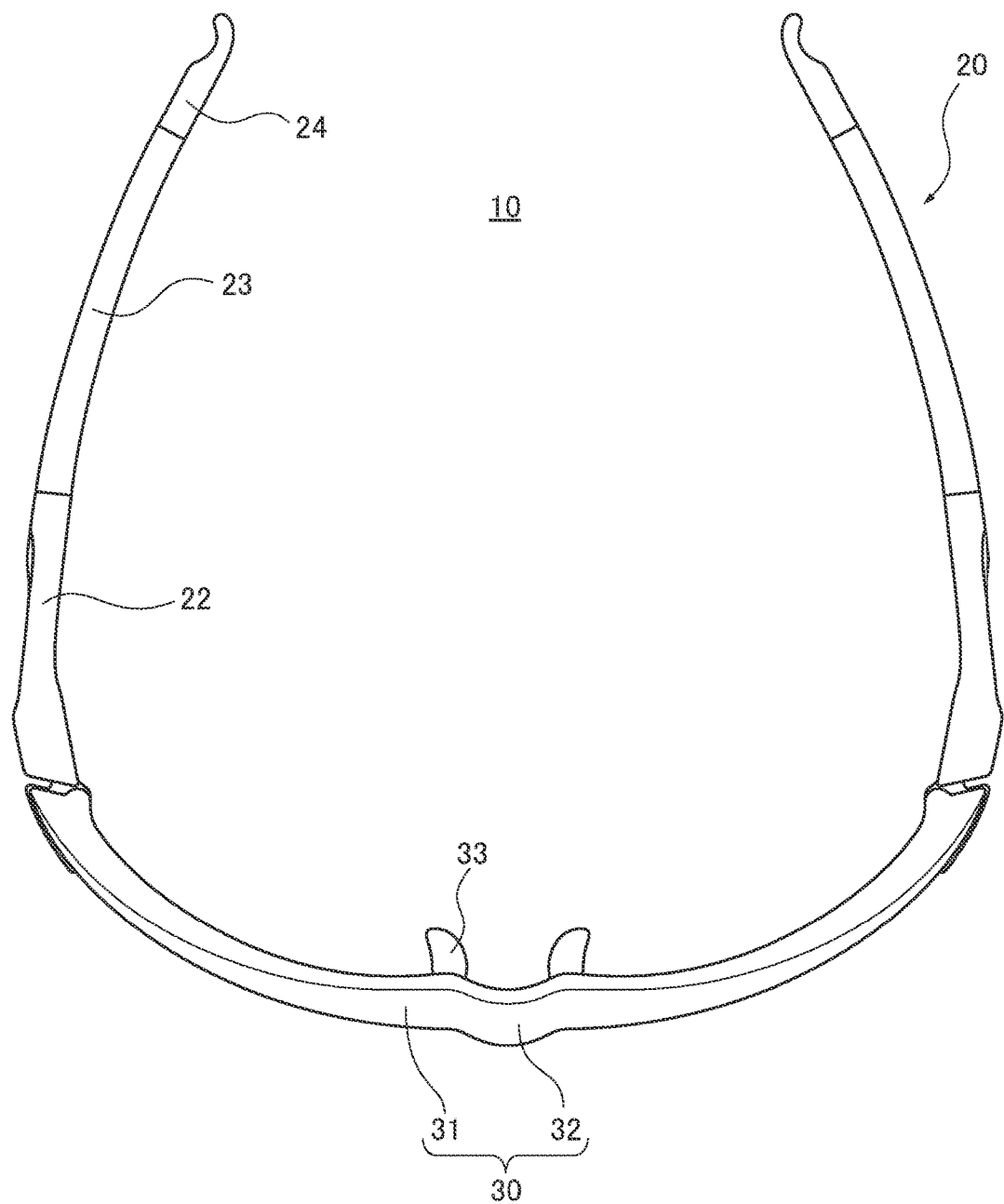
FIG. 1 is a plan view showing an overall configuration of an eyeglass frame according to a first embodiment of this disclosure.
Figure 2:
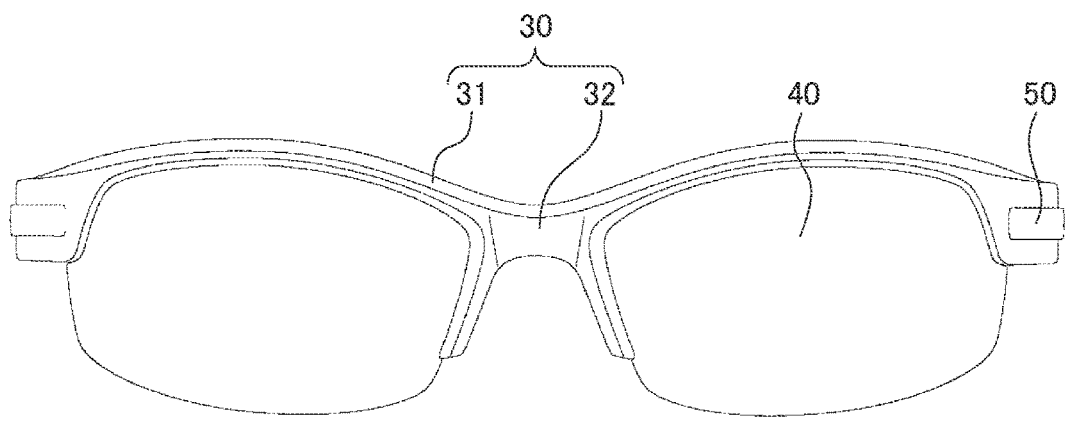
FIG. 2 is a front view of the eyeglass frame shown in FIG. 1.
Figure 3:
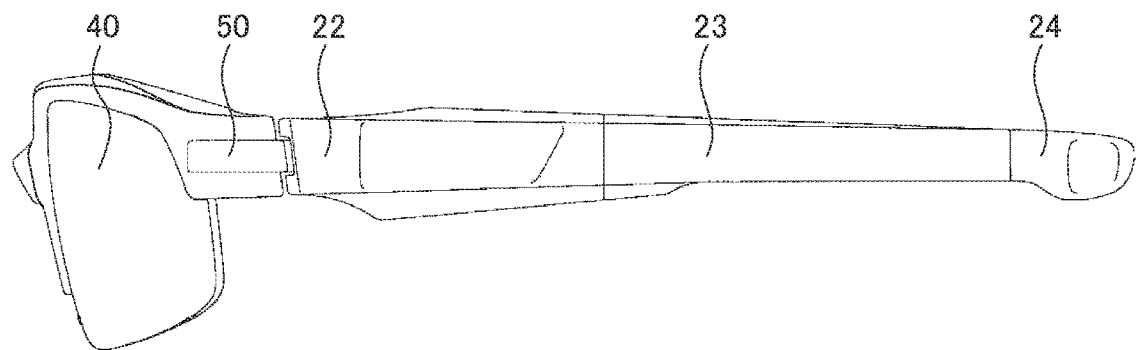
FIG. 3 is a right-side view of the eyeglass frame shown in FIG. 1.

As illustrated in FIGS. 1 to 3, the eyeglass frame 10 includes temples 20 and a front frame 30. The temples 20 are respectively attached to both ends of the front frame 30 by hinge parts 21c, 34 (explained later) so as to rotate inwardly and outwardly with respect to the front frame 30.

Figure 4:
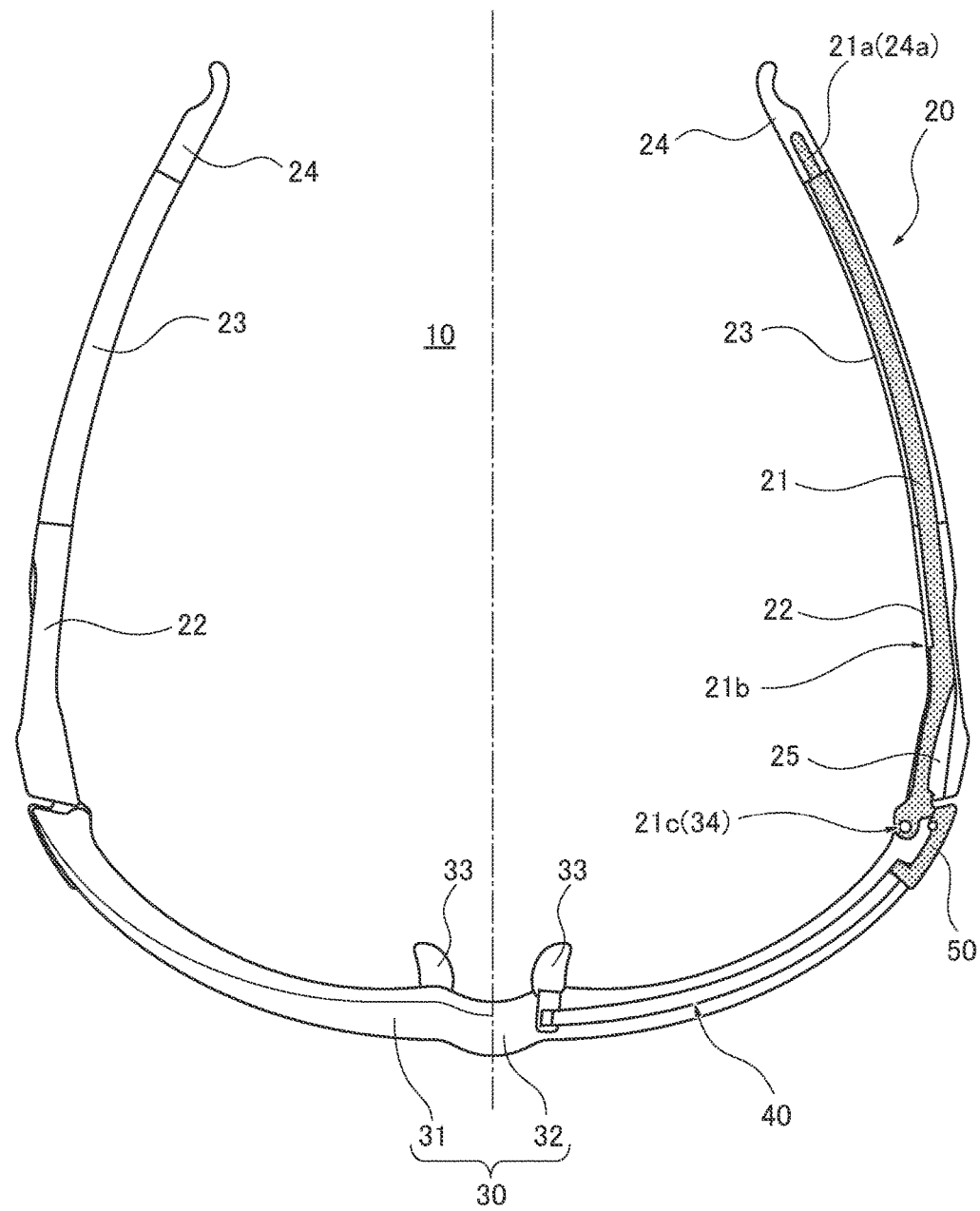
FIG. 4 is an explanation view for explaining a configuration of temples of the eyeglass frame shown in FIG. 1.
Figure 5:
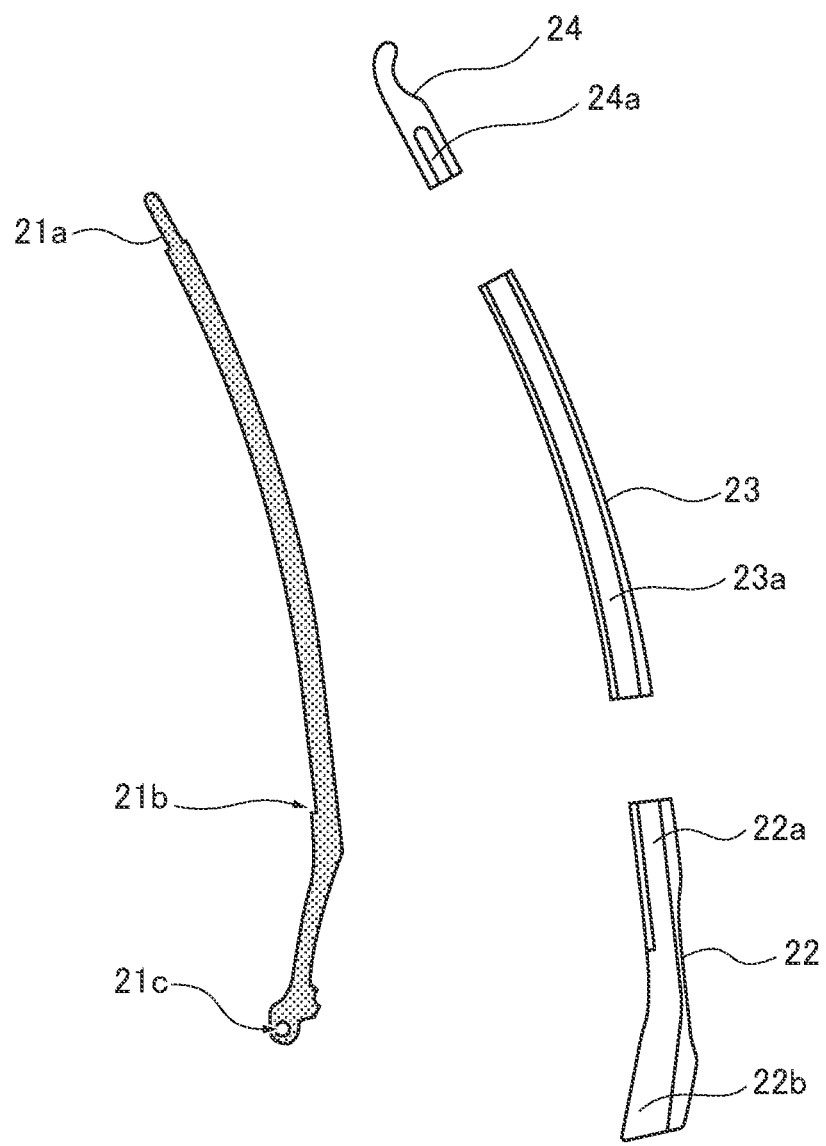
FIG. 5 is an explanation view showing parts configuring the temple shown in FIG. 1.

FIGS. 4 and 5 partially illustrate an internal structure of each part of the eyeglass frame 10 to facilitate understanding of the structure. As illustrated in FIG. 4, the temples 20 each include a temple core 21, a temple cover 22, a temple arm 23, and a tip cover 24.

As illustrated in FIG. 5, each of the temple covers 22 and temple arms 23 have a through hole 22a, 23a to insert the corresponding temple cores 21 therethrough, and the tip covers 24 are fitted to the end parts 21a of the corresponding temple cores 21 with the holes 24a formed inside the tip covers 24. That is, the temple covers 22, temple arms 23, and tip covers 24 are all configured to be removable and replaceable. Therefore, a user of the eyeglass frame 10 can easily change and replace these parts when they are worn away or when the user wants to change the appearance of the eyeglass frame 10.

The temple cores 21 each have a projection part 21b, and the temple covers 22 each have a recess 22b. The recesses 22b are connected to and integrally formed with the corresponding through holes 22a. When the temple covers 22 are attached to the corresponding temple cores 21, the end portions of the recesses 22b of the temple covers 22 abut to the projection parts 21b of the corresponding temple cores 21 so as to position the temple covers 22 with respect to the temple cores 21.

The temple cores 21, the temple covers 22, the temple arms 23, and the tip covers 24 are all made of resins and formed by injection molding. The temple arms 23 may be made of resin softer than that of the temple cores 21, and the like since the temple arms 23 touch the user's face (i.e., the user's temples). Here, the eyeglass frame 10 shown in the drawings is a frame for sport eyeglasses. That is, the eyeglass frame 10 shown in the drawings does not contain a metal component and is assembled without using a screw.

As illustrated in FIGS. 4 and 5, each of the temple cores 21 is formed such that the end portion on the front frame side of the temple core 21 is scooped and thinned inwardly. As a result, the eyeglass frame 10 has a clearance 25 between each temple core 21 and the corresponding temple cover 22 (i.e., has a clearance 25 on the outer side of each temple core 21). To be specific, the clearance 25 is formed inside the recess 22b of each temple cover 22.

In general, an eyeglass frame is configured such that positions of the temples are defined and fixed by a shape of the temples and a shape of the frame (i.e., by a shape of hinges). That is, when a user wears eyeglasses, the end portions of the temples (temple cores) abut to the end portions of the front frame. Thus, the movable range of the temples is fixed. When the temples are made of resin or any other elastic material, the movable range of the temples may slightly be expanded but the expanded movable range may still not be enough, thereby impairing comfortable wearing feeling of the eyeglasses.

Similar to other eyeglass frames, the eyeglass frame 10 according to this embodiment is also configured such that the movable range is principally defined by the shapes of the temple core 21 and the front frame 30. However, the eyeglass frame 10 according to the embodiment of this disclosure is configured to have the clearances 25 between the temple cores 21 and the corresponding temple covers 22 (i.e., inside the recess 22b), as described above. By having the clearances 25 on the both sides of the temples 20, the movable range of the temples 20 is further expanded outward with a simple structure. That is, the eyeglass frame 10 has high flexibility in the movement of temples 20 so as to be easily adjusted to the user's face.

Further, since the temple cores 21 are made of resin, it becomes possible to expand the movable range of the temples 20 easily. Additionally, owing to having the clearance 25 and being made of resin, the eyeglass frame 10 has high flexibility. With this, it suppresses undesired displacement of the eyeglass frame 10 during use even if the eyeglass frame 10 receives an external shock accidentally.

Therefore, the eyeglass frame 10 according to the embodiment of this disclosure may preferably be used for sports.

The front frame 30 includes rims 31 and a bridge 32, as illustrated in FIGS. 1 and 2. The rims 31 and the bridge 32 are integrally formed as a single member. Eyeglass lenses 40 are attached to the front frame 30 via the rims 31, and nose pads 33 are attached to the front frame 30 (to be specific, to the rims 31 respectively).

Here, an attachment structure of the eyeglass lenses 40 to the rims 31 will be described. The attachment structure includes hooks 50 provided on both outer ends of the front frame 30 and notch parts (not illustrated) provided on an outer circumferential side of each eyeglass lens 40.

In order to attach and fix the eyeglass lenses 40 to the rims 31, the hooks 50 are opened (moved to a disengaged position) and the eyeglass lenses 40 are fitted to grooves formed on the inner circumference side of the rims 31. Then, the hooks 50 are closed (moved to an engaged position) to engage with the notch parts of the eyeglass lenses 40. As a result, the eyeglass lenses 40 are firmly fixed to the front frame 30 (i.e., to the rims 31) so as to securely prevent the eyeglass lenses 40 from falling.

Here, a configuration of the hinge parts (21c, 34) of this embodiment will be described with reference to FIGS. 6A and 6B. In this embodiment, each of the hinge parts includes a hook part 21c and a counterpart 34.

Figure 6A:
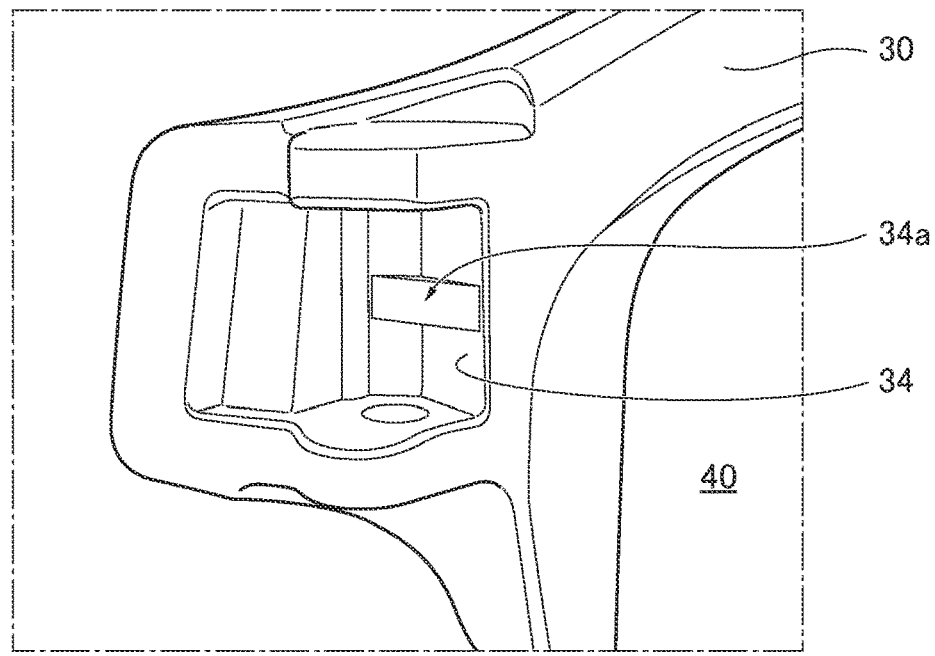
FIG. 6A is an explanation view for explaining a configuration of a hinge part of the eyeglass frame shown in FIG. 1.
Figure 6B:
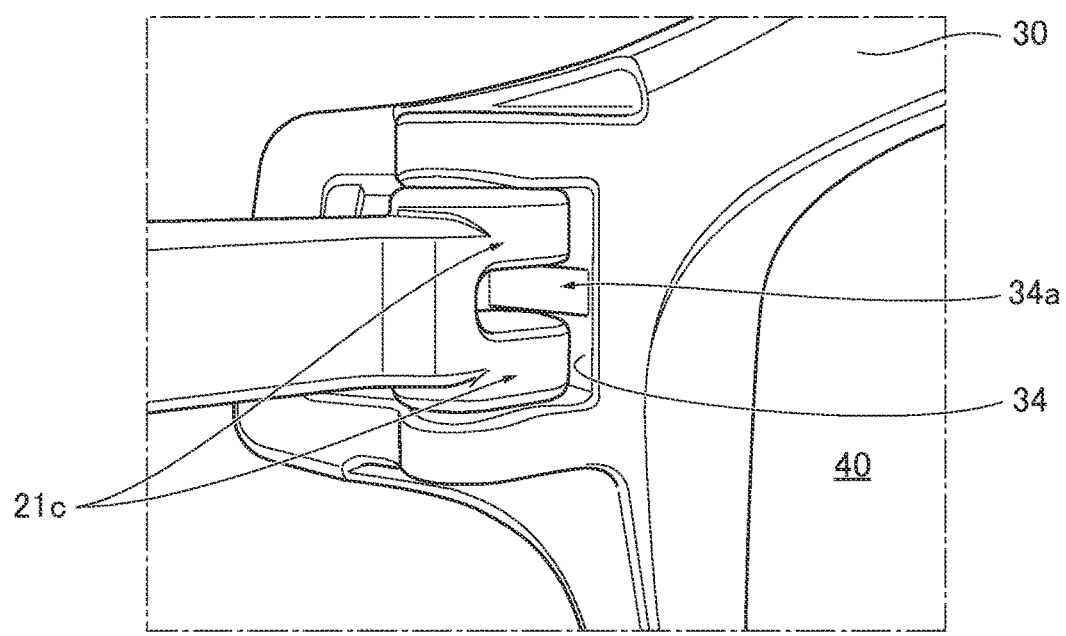
FIG. 6B is an explanation view for explaining the configuration of the hinge part of the eyeglass frame shown in FIG. 1.

As shown in FIGS. 6A and 6B, the temples 20 and the front frame 30 are attached to each other by a snap-fitting. To be specific, each temple core 21 has the hook part (convex part) 21c at the end portion of the temple core 21, and the front frame has the counterpart (concave part) 34 to be engaged with the hook part 21c. With this, the temples 20 and the front frame 30 are connected to each other. Note that the hook part 21c of this embodiment is formed as a pair of hooks.

Each of the counterparts 34 of the front frame 30 is formed with a projection portion 34a. The projection portion 34a is provided so as to be positioned between the pair of hooks (hook part 21c) when the hook part 21c is engaged with the counterpart 34. That is to say, the projection portion 34a functions as a member to suppress a deformation of the hook part 21c.

With this, the eyeglass frame 10 of this embodiment is possible to prevent the hook part 21c from being deformed. Therefore, the engagement between the hook part 21c and the counterpart 34 should not be released even when the temples 20 are widely rotated outside or when a twisting force is applied to the temples 20.

Although the configuration of the eyeglass frame 10 is described in detail, this is only an example and should not be limited to the above-described configuration. For instance, the temple covers 22, the temple arms 23, and the tip covers 24 may integrally be formed as single members. Further, depending on a desired movable range, the size of the recesses 22b formed in the temple covers 22 may be different from the one illustrated.

In the above described embodiment, the clearance 25 is formed by scooping and thinning each temple core 21. However, a method to form clearances should not be limited thereto. For instance, the clearances may be formed by having a larger recess on each temple cover. Further, as long as the clearances are formed between the temple core and the temple cover so as to allow the temple core to move outwardly, the shape of the temple cores and/or the shape of recesses of the temple covers should also not be limited to the above-described shape. For instance, although the illustrated temple covers have a groove-like shape in the cross-sectional view, the temple covers may have a stair-like shape in the cross-sectional view, or the temple covers may be formed to be a cylindrical shape.

In the above embodiment, the configurations of the hook parts 21c and the projection portion 34a of the counterparts 34 are described in detail. However, the configuration of the hinge parts (21c, 34) of the present disclosure should not be limited thereto. For instance, the projection portions 34a may be provided to separate the corresponding counterpart 34 into two parts, and an end portion of the corresponding temple core 21 (i.e., the hook part 21c) may be formed so as to engage with the counterpart 34. Alternatively, the snap-fitting of the hinge parts may be formed as an annular snap-fitting.

Although this disclosure has been described in terms of exemplary embodiment, it is not limited thereto. It should be appreciated that variations or modifications may be made in the embodiment described by persons skilled in the art without departing from the scope of the present invention as defined by the following claims.

What is claimed is:

1. An eyeglass frame, comprising:
a frame;
temples rotatably attached to the frame; and
eyeglass lenses attached to the frame; wherein
each of the temples includes a temple core and a temple cover and forms a clearance between the temple cover and the temple core on a side close to the frame,
each of the temples further includes a temple arm and a tip cover, and
the temple covers, the temple arms, and the tip covers are removably attached to the temple cores.

2. The eyeglass frame according to claim 1, wherein the temples are made of resin.

3. The eyeglass frame according to claim 1, wherein an end portion on a frame side of the temple core is scooped inwardly.

4. The eyeglass frame according to claim 1, wherein the frame and each of the temples are connected by a hinge part, the hinge part including a hook part provided at the corresponding temple and a counterpart provided at the frame, and
the counterpart is provided with a member that is configured to suppress deformation of the hook part.

5. An eyeglass frame, comprising:
a frame;
temples rotatably attached to the frame; and
eyeglass lenses attached to the frame,
wherein each of the temples includes a temple core and a temple cover and forms a clearance between the temple core and the temple cover,
wherein the frame and each of the temples are connected by a hinge part, the hinge part including a hook part provided at the corresponding temple and a counterpart provided at the frame,
wherein the counterpart is provided with a member that is configured to suppress deformation of the hook part.

6. An eyeglass frame, comprising:
a frame;
temples rotatably attached to the frame; and
eyeglass lenses attached to the frame; wherein
each of the temples includes a temple core and a temple cover and forms a clearance fully enclosed inside the corresponding temple between the temple cover and the temple core on a side close to the frame.

* * * * *